United States Patent
Farivar et al.

(10) Patent No.: US 11,495,212 B2
(45) Date of Patent: *Nov. 8, 2022

(54) DYNAMIC VOCABULARY CUSTOMIZATION IN AUTOMATED VOICE SYSTEMS

(71) Applicant: Capital One Services, LLC, McLean, VA (US)

(72) Inventors: Reza Farivar, Champaign, IL (US); Jeremy Edward Goodsitt, Champaign, IL (US); Fardin Abdi Taghi Abad, Champaign, IL (US); Austin Grant Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/931,806

(22) Filed: Jul. 17, 2020

(65) Prior Publication Data

US 2020/0349926 A1 Nov. 5, 2020

Related U.S. Application Data

(63) Continuation of application No. 16/168,480, filed on Oct. 23, 2018, now Pat. No. 10,720,149.

(51) Int. Cl.
| | |
|---|---|
| *G10L 15/08* | (2006.01) |
| *G06F 3/16* | (2006.01) |
| *G10L 15/02* | (2006.01) |
| *G10L 15/22* | (2006.01) |
| *G10L 25/03* | (2013.01) |

(52) U.S. Cl.
CPC .............. *G10L 15/08* (2013.01); *G06F 3/167* (2013.01); *G10L 15/02* (2013.01); *G10L 15/22* (2013.01); *G10L 25/03* (2013.01); *G10L 2015/088* (2013.01)

(58) Field of Classification Search
USPC ......................................... 704/200, 246–252
See application file for complete search history.

(56) References Cited

U.S. PATENT DOCUMENTS 6,442,519 B1 * 8/2002 Kanevsky ............... G10L 15/07
  704/270.1
6,484,136 B1 * 11/2002 Kanevsky ............... G06F 40/40
  704/255

(Continued)

*Primary Examiner* — Leonard St. Cyr
(74) *Attorney, Agent, or Firm* — KDB

(57) ABSTRACT

Techniques to dynamically customize a menu system presented to a user by a voice interaction system are provided. Audio data from a user that includes the speech of a user can be received. Features can be extracted from the received audio data, including a vocabulary of the speech of the user. The extracted features can be compared to features associated with a plurality of user group models. A user group model to assign to the user from the plurality of user group models can be determined based on the comparison. The user group models can cluster users together based on estimated characteristics of the users and can specify customized menu systems for each different user group. Audio data can then be generated and provided to the user in response to the received audio data based on the determined user group model assigned to the user.

20 Claims, 10 Drawing Sheets

(56) References Cited

U.S. PATENT DOCUMENTS

| | | |
|---|---|---|
| 8,428,934 B2 | 4/2013 | Connor |
| 10,242,668 B2 * | 3/2019 | Mun ............... G10L 15/183 |
| 2002/0184270 A1 | 12/2002 | Gimson |
| 2005/0075875 A1 * | 4/2005 | Shozakai ............ G10L 15/07 |
| | | 704/231 |
| 2009/0138263 A1 * | 5/2009 | Shozakai ........... G06K 9/6261 |
| | | 704/E15.001 |
| 2012/0245939 A1 * | 9/2012 | Braho ............. G10L 15/065 |
| | | 704/243 |
| 2014/0279068 A1 | 9/2014 | Systrom et al. |
| 2017/0069314 A1 * | 3/2017 | Mun ............... G10L 15/183 |
| 2018/0018959 A1 | 1/2018 | Des Jardins et al. |
| 2018/0293221 A1 * | 10/2018 | Finkelstein .......... G06N 20/00 |
| 2019/0012714 A1 | 1/2019 | Bright |

* cited by examiner

"I suspect my Internet service is not functioning properly. My laptop is properly configured and is plugged into the Ethernet port of my router, but the indicator light on the router confirming remote connectivity is blinking red."

"Is your Internet modem box plugged into an electrical outlet?"

"It appears your router is properly plugged into a power source and is properly connected to your laptop. Will you consent to us remotely testing the router to determine if the connectivity problem is on our end?"

DYNAMIC VOCABULARY CUSTOMIZATION IN AUTOMATED VOICE SYSTEMS

RELATED APPLICATIONS

This application is a continuation of U.S. patent application Ser. No. 16/168,480, filed Oct. 23, 2018, titled "DYNAMIC VOCABULARY CUSTOMIZATION IN AUTOMATED VOICE SYSTEMS". The contents of the aforementioned application are incorporated herein by reference in their entirety.

TECHNICAL FIELD

Embodiments described herein generally relate to dynamic customization of an automated voice system.

BACKGROUND

Many conventional voice interaction systems provide static voice menus to a user. That is, the voice menu system is fixed and is provided to each different user in the same manner in terms of content and sequence of presentation. As a result, many highly advanced users may find the static voice menus overly simplistic and therefore frustrating. Relatedly, many less advanced users may find the static voice menus too complex and difficult to navigate. Overall, providing the same voice menu system to each user can lead to user dissatisfaction with conventional voice interaction systems.

Accordingly, there is a need for an adaptive voice interaction system that can customize various features of the menu system to particular groups of users.

BRIEF DESCRIPTION OF THE DRAWINGS

FIG. 3 illustrates second speech received by the voice interaction system depicted in FIG. 1.
FIG. 4 illustrates first audio data generated in response to the first speech depicted in FIG. 2.
FIG. 5 illustrates second audio data generated in response to the second speech depicted in FIG. 3.

DETAILED DESCRIPTION

This disclosure presents various systems, components, and methods related to providing customizable voice menu systems to various groups of related users. Each of the systems, components, and methods disclosed herein provides one or more advantages over conventional systems, components, and methods.

Various embodiments include techniques to dynamically customize a menu system presented to a user by a voice interaction system. Audio data from a user that includes the speech of a user can be received. The speech of the user can relate to an issue for which the user may request help or guidance. One or more features can be extracted from the received audio data, including a vocabulary of the speech of the user. The extracted features from the received audio data can be compared to features associated with a plurality of user group models. A user group model to assign to the user from the plurality of user group models can be determined based on the comparison of the extracted features from the received audio data and the features associated with the plurality of user group models. The user group models can cluster users together based on, for example, perceived or estimated education levels, domain knowledge levels, or language literacy levels. The user group models can specify different menu system customizations that can vary by presented content, sequence of presented options, vocabulary or terminology, as well as by tone, accent, or dialect. Audio data can then be generated in response to the received audio data based on the determined user group model assigned to the user. The generated responsive audio data is then provided to the user. Other embodiments are disclosed and described.

Figure 1:
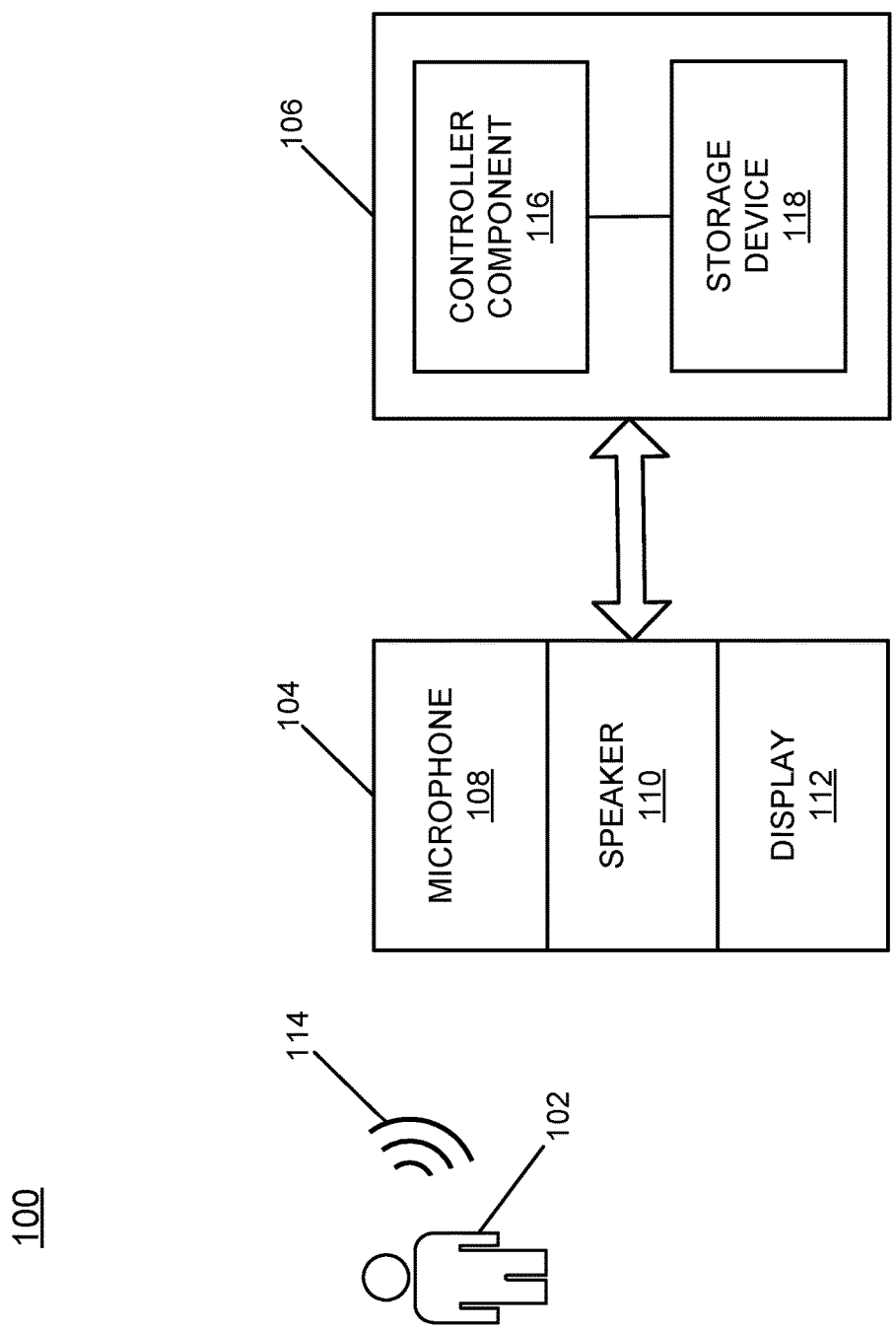
FIG. 1 illustrates an operating environment.

FIG. 1 illustrates an operating environment 100 such as may be representative of various embodiments in which techniques for dynamic vocabulary customization in an automated voice system may be implemented. The operating environment 100 can include a user 102, a first device 104, and a second device 106. In various embodiments the first device 104 can be a local device that can be a handheld device (e.g., held by the user 102). In various embodiments the second device 106 can be a voice interaction system or an automated voice system. The first and second devices 104 and 106 can be part of the same device or can be portions of different (e.g., physically separated) devices. In various embodiments, the second device 106 can be located remote from the first device 104. For purposes of illustration and for ease of explanation only, the first device 104 will be referred to as a local device and the second device 106 will be referred to as a voice interaction system with the understanding that the local device 104 can be part of the voice interaction system 106.

In various embodiments, the local device 104 can include a microphone 108, a speaker 110, and a display 112. In various embodiments, the local device 104 may not include the display 112. In various embodiments, the display 112 can be a touchscreen. The microphone 108 can receive audible data or information including spoken or verbalized speech 114 of the user 102. The local device 104 can be any type of computing device including, for example, a desktop computer, a laptop computer, a tablet, a mobile computing device, a smartphone, a set-top box, a remote (e.g., a television remote), or any other type of device capable of receiving the speech 114 of the user 102. The local device 104 can include additional components not shown in FIG. 1.

The voice interaction system 106 can include a controller component 116 and a storage device 118. The controller component 116 can be implemented in software, hardware, or any combination thereof. The controller component 116 can be a processor and/or can include logic for implement the techniques and/or features described herein. The storage device 118 can be any type of memory storage device. The voice interaction system 106 can receive the speech information 114 from the user 102, can process the speech information 114 to determine what was spoken by the user 102, and can respond to the user 102. In various embodiments, the voice interaction system 106 can direct the local device 104 to provide audible information back to the user 102 (e.g., by way of the speaker 110) and/or visual information back to the user 102 (e.g., by way of the display 112). In general, the user 102 may interact with the voice interaction system 106 to request help on an issue such as, for example, any type of customer service issue related to a product or service.

In various embodiments, the local device 104 can receive and store the speech 114 of the user 102 and can provide the stored speech to the voice interaction system 106. In various embodiments, the local device 104 can include its own controller component and storage device (not shown for simplicity) or can include the controller component 116 and/or the storage device 118 as part of the local device 104 (e.g., to form a combined local device 104—voice interaction system 106).

In various embodiments, when the local device 104 and the voice interaction system 106 are located remotely from one another, the local device 104 and the voice interaction system 106 can communicate and/or share any data or information over a communication link. The data can be any type of data including voice data. The communication link can comprise one more computer networks or links. The communication link can include, for example, one or more wireless communication systems that operate according to one or more wireless communication standards or protocols over any frequency band or range. The communication link can include, for example, one or more wired communication systems that operate according to one more wired communication standards or protocols over any type of wired media. The local device 104 and the voice interaction system 106 can communicate according to any computer network protocol including any Internet-related communication protocol to facilitate the sharing of any type of data between the local device 104 and the voice interaction system 106.

The voice interaction system 106—either including or not including a portion of the local device 104—can receive audio data from the user 102. The audio data can include the speech 114 of the user 102. In various embodiments, the audio data can relate to an issue related to the user 102. For example, the issue can relate to a customer service issue or question of the user 102 including issues relating to operation of a device or service. As an example, the speech 114 of the user 102 can relate to a question the user 102 has regarding an internet service provided to the user 102. The voice interaction system 106 can be a system and/or service provided to the user 102 for responding to customer service issues of the user 102 including troubleshooting issues for any product or service provided to the user 102.

The voice interaction system 106 process any audio data from the user 102. In various embodiments, the voice interaction system 106 can extract one or more features from the audio data from the user 102. The features can include a speed of the speech 114, phrases included in the speech 114, terminology and/or vocabulary included in the speech 114, and an accent, dialect, tone, and/or pronunciation of the user 102.

The voice interaction system 106 can compare any extracted features with features (e.g., comparison features) associated with various different user interaction models (or user group models or group user models). The user interaction models can be categorized based on a number of factors including a background or experience of the user 102, an education level of the user 102, a literacy level of the user 102, and/or a domain knowledge of the user 102 as it relates to the issue of the user 102. Further, the user interaction models can specify how to interact with a user mapped to a particular model. For example, based on the extracted features from the speech 114, the user 102 can be classified or clustered into a particular user interaction model. Users clustered into the same user interaction model can have similar (or perceived or estimated) education levels, literacy levels, speech patterns, dialects, and/or knowledge of the issue that the users are interacting with the voice interaction system 106 to resolve. The determined user interaction model can then specify what responsive audio to provide the user 102 including any variations in a voice menu and/or visual menu provided to the user 102. In this way, the response of the voice interaction system 106 can be customized to the user 102, thereby providing a more efficient and satisfying experience for the user 102.

In various embodiments, the voice interaction system 106 can vary or adjust voice menu systems that can be provided to the user 102 (e.g., in response to the speech 114) based on the determined category or group model assigned the user 102. For example, the number or type of options provided to the user 102 either audibly and/or visually can be adjusted, the terminology and/or vocabulary in responsive audio data provided to the user 102 can be varied or adjusted, and/or a speed, a dialect, and/or an accent of the audio data provided to the user can be varied or adjusted. As a further example, the vocabulary and/or terminology used to describe the menu options (either audibly or visually) can be dynamically customized during interaction with the user 102 based on the features extracted from the audio data provided by the user 102 throughout the entirety of the interaction of the user 102 with the voice interaction system 106—for example, based on additional audio data provided by the user 102 during an interaction session with the voice interaction system 106.

In various embodiments, the controller component 116 can receive the speech 114 of the user as audio data, can parse the words or phrases within the speech 114, and can extract one or more features from the speech 114 as described herein. The controller component 116 can then compare the one or more extracted features from the speech 114 to the features associated with the different user interaction models. In various embodiments, the storage device 118 can store information relating to the different user interaction models. For example, the storage device 118 can store one or more features relating to each user interaction model. The controller component 116 can compare the extracted features to the stored comparison features to determine which user interaction model best fits or matches the user 102.

The storage device 118 can store each user interaction model and/or information indicative of each user interaction model. As an example, the storage device 118 can store voice and/or visual menu systems relating to each user interaction model. In various embodiments, the storage device 118 can specify the menu options to provide to the user 102—for example, which may vary by terminology, vocabulary, dialect, etc.—that the controller component 116 can implement when generating and providing responsive audio and/or visual data to the user 102.

In various embodiments, the storage device 118 can store a set of menu options (audible and/or visual) with an indication as to how the menu options are to be varied based on the particular classification of the user in relation to a user interaction model. The controller component 116 can then use the stored menu options and stored indications to vary the presentation of the menu options to the user. In this way, a more sophisticated user with a high level of domain knowledge as to her issue can be quickly provided with more advanced menu options to more quickly address the issue of the sophisticated user while a less sophisticated user with a low level of domain knowledge as to her issue can be lead more slowly through different options for resolving her issue.

Accordingly, the voice interaction system 106 can group similar users by perceived or estimated characteristics—such as, for example, perceived or estimated education level, comfort level or familiarity with a particular issue (e.g., technical issue), and language literacy level, as well as perceived or estimate age and sex and perceived or estimate speaking characteristics relating to tone, accent, dialect, and speed of speaking. The voice interaction system 106 can then provide adaptable voice menu systems to the similarly grouped users such that the voice menu systems can vary for each different set of grouped users. The menu systems can vary in a number of manners including options presented to the users, the sequence in which the options are presented, and the vocabulary or terminology used to describe the menu options or features described therein. The menu systems can vary by adding or removing certain options for presentation to different user groups, thereby adaptively and dynamically presenting a more meaningful and relatable menu system to each different user group. In turn, user satisfaction with the experience of interacting with the voice interaction system 106 is improved.

In various embodiments, the user interaction model determined by the voice interaction system 106 can specify or indicate a customer service representative for the user 102. For example, a different customer service representative may be matched to the user 102 based on the determined language literacy, domain knowledge, education level, etc. of the user 102 such that a more advanced customer service agent can be linked to the user 102 having high language literacy and high domain knowledge while an entry level customer service agent may be linked to a the user having lower language literacy and/or domain knowledge.

Audio and/or visual data generated by the controller component 116 in response to the received speech 114 can be provided to the local device 104 for presentation to the user 102. Audio data can be provided to the user 102 through the speaker 110. Visual and/or graphical data can be provided to the user 102 through the display 112.

In various embodiments, the controller component 116 can determine a user category and/or user interaction for the user 102 based on the extracted features from the speech 114 in a variety of manners. For example, the controller component 116 can compare the extracted features to stored features for each different model. The determined model for the user 102 can then be selected based on a statistical probability model or analysis of which model best fits or matches the user 102. In various embodiments, a count of the number of matches between extracted features and stored comparison features for a model can be determined, with the best fit model having the highest match count. In various embodiments, a machine learning model such as a recurrent neural network (RNN) can be used to implement categorization of the user 102 based on the extracted feature set from the speech 114.

In various embodiments, one or more binary classification or classifier models can be implemented in parallel based on the extracted features from the speech 114 in order to train or determine a category for the user 102. In various embodiments, a logistic regression model can be used to determine a category for the user 102 based on the extracted features from the speech 114. In various embodiments, a statistical parametric mapping (SPM) technique can be used to determine a category for the user 102 based on the extracted features from the speech 114.

Figure 2:
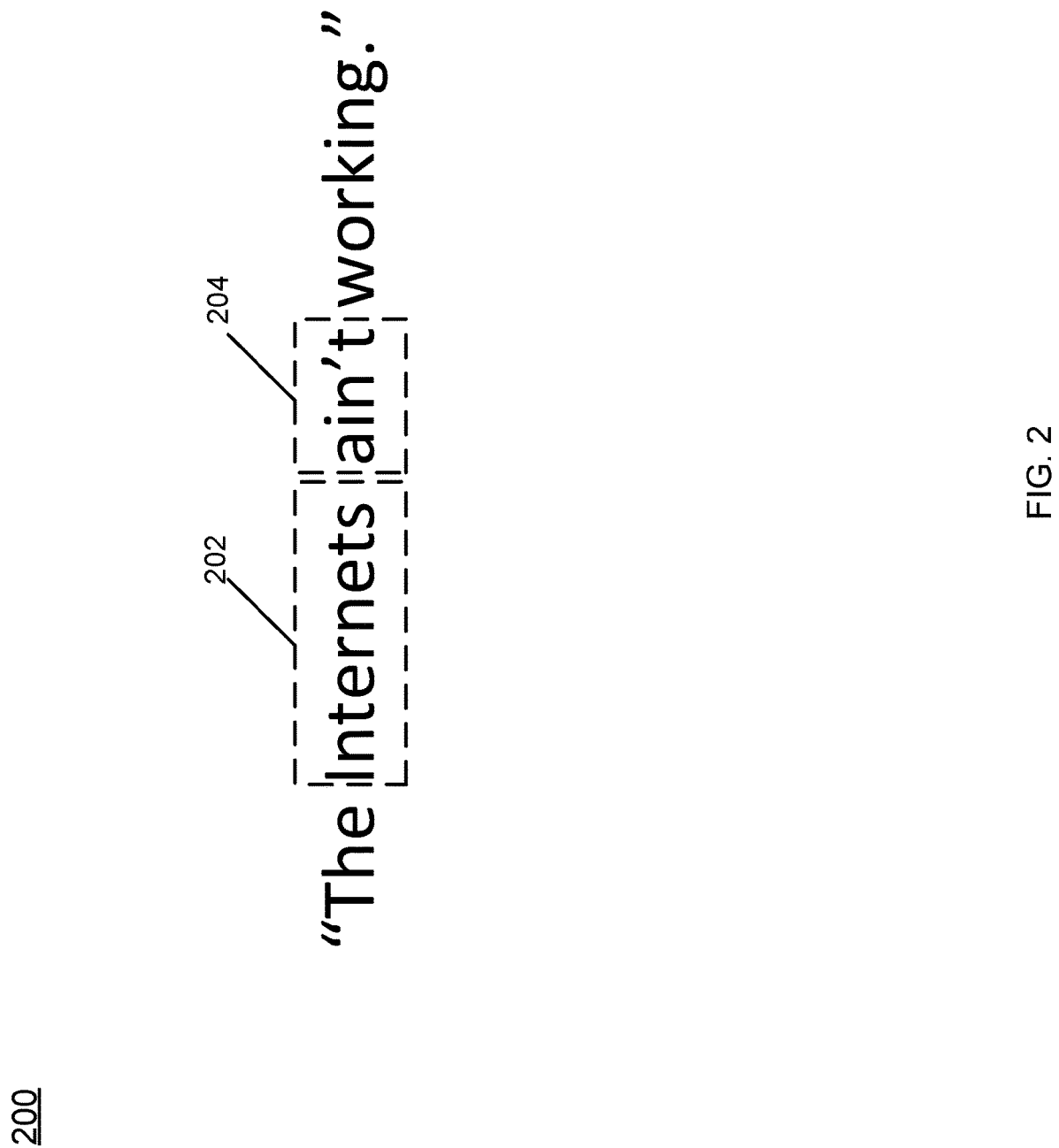
FIG. 2 illustrates first speech received by the voice interaction system depicted in FIG. 1.

FIG. 2 illustrates a first example 200 of the speech 114 of the user 102 as received by the voice interaction system 106. The example speech 200 can be spoken by the user 102 into the microphone 108 of the local device 104. The example speech 200 can be provided by the user 102 in an attempt to prompt the voice interaction system 106 to recognize an issue being experienced by the user 102 and to provide guidance to the user 102 to address the issue.

As shown in FIG. 2, the example speech 200 can comprise a short sentence spoken by the user 102. The example speech 200 can be provided to the voice interaction system 106. The voice interaction system 106 can receive the example speech 200 as audio data. The voice interaction system 106 can review and process the example speech 200. In particular, the voice interaction system 106 can extract one or more features from the example speech 200 including, for example, the terminology and/or vocabulary within the example speech 200, the speed and/or dialect of the example speech 200, and/or any of the other example audio or speech features described herein.

The voice interaction system 106, based on the example speech 200, can determine the user 102 is stating that the internet service of the user 102 is not working. Further, the voice interaction system 106 can flag a first feature 202 and a second feature 204 of the example speech 200. The first feature 202 and the second feature 204 can be used to determine a category of the user 102 and/or to match the user 102 to a specific group user model or user interaction model. The first feature 202 and the second feature 204 can be used by the voice interaction system 106 to determine that that the user has a low level of domain knowledge about her internet service and/or how to troubleshoot issues related to her internet service. The first feature 202 and the second feature 204 can be used by the voice interaction system 106 to also determine that the user has a low level of language literacy.

The voice interaction system 106 can make these determinations and determine the category for the user 102 by focusing on the first and second features 202 and 204 as vocabulary or terminology used in the example speech 200. These first and second terminology or vocabulary features 202 and 204 can be compared to other term or vocabulary features stored in the storage device 118 for each different user interaction model. Based on a comparison of characteristic vocabulary terms stored for a particular user interaction model and the first and second terminology or vocabulary features 202 and 204, the voice interaction system 106 can classify the user 102 into a particular group or cluster of similar users—including, for example, determining a user interaction model for the user based on the classification and/or clustering of the user 102.

Based on the determined classification of the user—for example, based on the first and second terminology or vocabulary features 202 and 204—the voice interaction system 106 can generate responsive audio to the example speech 200. As disclosed herein, the responsive audio can include data indicative of a voice and/or visual menu system that is adjusted based on the determined classification and/or user interaction model for the user 102. In general, any number of features can be extracted from the speech 114.

FIG. 3 illustrates a second example 300 of the speech 114 of the user 102 as received by the voice interaction system 106. The example speech 300 can be spoken by the user 102 into the microphone 108 of the local device 104. The example speech 300 can be provided by the user 102 in an attempt to prompt the voice interaction system 106 to recognize an issue being experienced by the user 102 and to provide guidance to the user 102 to address the issue.

As shown in FIG. 3, the example speech 300 can comprise multiple sentences spoken by the user 102. The example speech 300 can be provided to the voice interaction system 106. The voice interaction system 106 can receive the example speech 300 as audio data. The voice interaction system 106 can review and process the example speech 300. In particular, the voice interaction system 106 can extract one or more features from the example speech 300 including, for example, the terminology and/or vocabulary within the example speech 300, the speed and/or dialect of the example speech 300, and/or any of the other example audio or speech features described herein.

The voice interaction system 106, based on the example speech 300, can determine the user 102 is stating that the internet service of the user 102 is not working. Further, the voice interaction system 106 can flag features 302 through 310 of the example speech 200 (e.g., first feature 302, second feature 304, third feature 306, fourth feature 308, and fifth feature 310). The features 302-310 can be used to determine a category of the user 102. The features 302-310 can be used by the voice interaction system 106 to determine that that the user has a high level of domain knowledge about her internet service and/or how to troubleshoot issues related to her internet service. The features 302-310 can be used by the voice interaction system 106 to also determine that the user has a high level of language literacy.

The voice interaction system 106 can make these determinations and determine the category for the user 102 by focusing on the features 302-310 as vocabulary or terminology used in the example speech 300. These terminology or vocabulary features 302-310 can be compared to other term or vocabulary features stored in the storage device 118 for each different user interaction model. Based on a comparison of characteristic vocabulary terms stored for a particular user interaction model and the terminology or vocabulary features 302-310, the voice interaction system 106 can classify the user 102 into a particular group or cluster of similar users—including, for example, determining a user interaction model for the user based on the classification and/or clustering of the user 102.

Based on the determined classification of the user—for example, based on the terminology or vocabulary features 302-310—the voice interaction system 106 can generate responsive audio to the example speech 300. As disclosed herein, the responsive audio can include data indicative of a voice and/or visual menu system that is adjusted based on the determined classification and/or user interaction model for the user 102.

FIG. 4 illustrates a first example audio data 400 generated in response to the example speech 200. The first example audio data 400 can be generated by the voice interaction system 106 based on the determination of the user interaction model for the user 102 based on the example speech 200. As it was determined that the user 102 had a low language literacy and a low domain knowledge of issues relating to technical problems with internet service connectivity, the first example audio data 400 can begin by requesting the user 102 first check that her internet modem is properly receiving power.

The first example audio data 400 can be stored by the storage device 118. The user interaction model determined for the user 102 based on the example speech 200 can specify that the first example audio data 400 is to be generated and provided to the user 102 first in response to the example speech 200. In various embodiments, the first example audio data 400 can reflect an adjustment of a standard set of menu options available to be provided to the user 102. For example, a standard model for interacting with users that can include the first example audio data 400 as an option that can be provided to the user 102. The user interaction model determined for the user 102 based on the example speech 200 can specify that the standard model should be modified to enable the first example audio data 400 is to be initially provided to the user 102. The first example audio data 400 can include dynamically adjusted vocabulary to better match the capabilities of the user 102.

The first example audio data 400 can be generated by the controller component 116 and provided to the local device 104. The local device 104 can then provide the first example audio data 400 to the user by, for example, audibly providing the first example audio data 400 through the speaker 110. The first example audio data 400 can include terminology or vocabulary that is likely to be understood by the user 102. Further, the first example audio data 400 can be generated to include a speed, tone, and/or dialect that matches the example speech 200 to increase a likelihood that the first example audio data 400 is understood by the user 102.

FIG. 5 illustrates a second example audio data 500 generated in response to the example speech 300. The second example audio data 500 can be generated by the voice interaction system 106 based on the determination of the user interaction model for the user 102 based on the example speech 300. As it was determined that the user 102 had a high language literacy and a high domain knowledge of issues relating to technical problems with internet service connectivity, the second example audio data 500 can begin by assuming the components on the end of the user 102 are properly powered and configured and can request consent on the part of the user 102 that a remote test be conducted.

The second example audio data 500 can be stored by the storage device 118. The user interaction model determined for the user 102 based on the example speech 300 can specify that the second example audio data 500 is to be generated and provided to the user 102 first in response to the example speech 300. In various embodiments, the second example audio data 500 can reflect an adjustment of a standard set of menu options available to be provided to the user 102. For example, a standard model for interacting with users that can include the second example audio data 500 as an option that can be provided to the user 102. The user interaction model determined for the user 102 based on the example speech 300 can specify that the standard model should be modified to enable the second example audio data 500 is to be initially provided to the user 102. The second example audio data 500 can include dynamically adjusted vocabulary to better match the capabilities of the user 102.

The second example audio data 500 can be generated by the controller component 116 and provided to the local device 104. The local device 104 can then provide the second example audio data 500 to the user by, for example, audibly providing the second example audio data 5 through the speaker 110. The second example audio data 500 can include terminology or vocabulary that is likely to be understood by the user 102. Further, the second example audio data 500 can be generated to include a speed, tone, and/or dialect that matches the example speech 300 to increase a likelihood that the second example audio data 500 is understood by the user 102.

Figure 6:
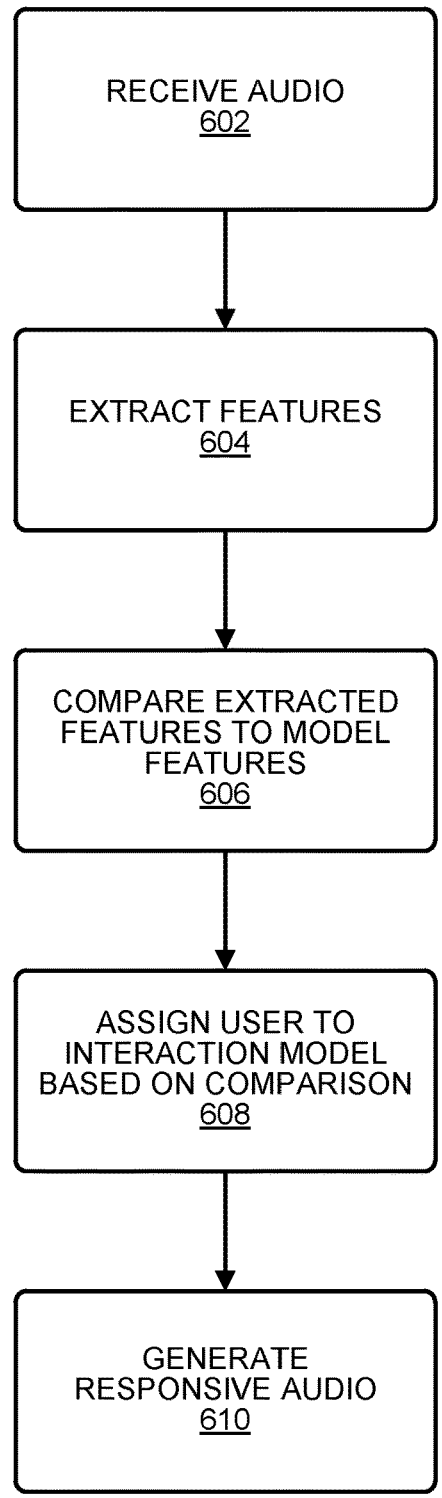
FIG. 6 illustrates a first logic flow.

FIG. 6 illustrates an example of a logic flow 600 that may be representative of a voice interaction system dynamically adjusting a voice menu system provided to a user. For example, the logic flow 600 may be representative of operations that may be performed in various embodiments by the voice interaction system 106 in the operating environment 100 of FIG. 1.

At 602, the voice interaction system 106 can receive audio data. The audio data can include speech 114 from the user

102. The audio data can be received by a microphone (e.g., the microphone 108) and can be stored (e.g., in the storage device 118). The audio data can be converted into a digital format to facilitate storage and transmission. The voice interaction system 106 can be local to the user 102 or can be located remote from the user. In various embodiments, portions of the voice interaction system 106 can be located locally and portions can be located remotely. In various embodiments, the voice interaction system 106 can include all or a portion of the components of the local device 104. The speech 114 of the user 102 can relate to an issue of the user 102. The issue can be any customer service issue related to a service or product. The speech 114 can include a query or request for assistance.

At 604, the voice interaction system 106 can extract and/or determine one or more features from the received audio data. In various embodiments, a vocabulary of the speech 114 can be extracted. Other features that can be extracted include terminology, dialect, accent, speech of the speech 114, tone of the speech 114, phrases used in the speech 114 (e.g., terms of speech, colloquialisms, idioms, speech mannerisms, etc.). The extracted features and data indicative of the same including any analysis data relating to the speech 114 of the user 102 can be stored in the storage device 118.

At 606, the stored extracted features from the speech 114 of the user 102 can be compared to features associated with or relating to two or more user group models. In various embodiments, two or more user group models can be established that group users by a variety of characteristics including, for example, language literacy, accent, dialect, vocabulary or terminology usage, domain knowledge, education level, etc. Features associated with each user group model can be compared to the extracted features to determine similarities and differences between the extracted features and the stored group user features.

At 608, a group user model can be determined for the user 102. The group user model can be determined and assigned to the user 102 based on the comparison of the extracted features form the speech 114 of the user 102 and the features associated with each group user model. In various embodiments, a statistical probability model (or any probabilistic analysis technique) can be implemented to determine a group user model for the user 102. In various embodiments, a machine learning model including, for example, an RNN, can be implemented to determine a group user model for the user 102. In various embodiments, one or more binary classification or classifier models can be implemented in parallel to determine a group user model for the user 102. In various embodiments, a logistic regression model can be implemented to determine a group user model for the user 102. In various embodiments, an SPM technique can be implemented to determine a group user model for the user 102.

In various embodiments, multiple users having similar characteristics in relation to language literacy, education level, vocabulary and/or terminology usage, accent, dialect, domain knowledge, etc. can be grouped or clustered into the same group user model.

At 610, audio data can be generated in response to the audio data received by the voice interaction system 106. The responsive audio data can include information responsive to the issue of the user 102. The responsive audio data can be generated based on the determined user group model assigned to the user 102. The group user model for the user 102 can be an interaction model for the user 102 and/or can specify a manner for interacting with the user 102. To that end, the audio data can be generated based on an associated language literacy, education level, vocabulary and/or terminology usage, accent, dialect, domain knowledge, etc. for the determined model designed to match the characteristics of the user 102.

The responsive audio can be generated by the voice interaction system 106. In various embodiments, the audio can be generated based on audio stored in the storage device 118. In various embodiments, the audio can reflect an adjustment of voice menu options based on the determined user group model assigned to the user 102. In various embodiments, the audio can be provided to the speaker 110 for audible playback. The generated audio can include voice menu options or questions for the user 102. The voice menu options or queries for the user 102 can be determined and/or adjusted based on the issue identified by the user 102 and the user group model determined for the user 102.

In various embodiments, in addition to audio data, graphical or visual data can be generated based on the assigned user group model for the user 102. The additional graphical data can be provided to the display for 112 for rendering on the local device 104.

In various embodiments, additional audio data can be received by the voice interaction system 106 and additional audio data can be generated in response thereto by the voice interaction system 106. In general, a conversation between the user 102 and the voice interaction system 106 can occur with the voice menu system provided by the voice interaction system 106 being dynamically adjusted at least based on vocabulary after determining a group user model for the user 102. Accordingly, subsequent generated audio can be generated based on the user group model identified at 608. In various embodiments, based on the issue presented by the user 102 and the user group model determined at 608, an entire menu system can be determined to guide any further interaction with the user 102 during a session with the voice interaction system 106.

Figure 7:
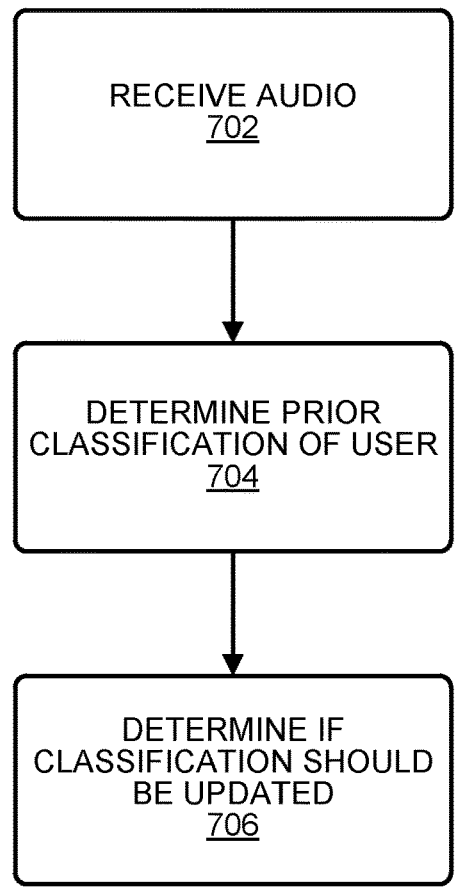
FIG. 7 illustrates a second logic flow.

FIG. 7 illustrates an example of a logic flow 700 that may be representative of a voice interaction system updating a model for interacting with a user. For example, the logic flow 700 may be representative of operations that may be performed in various embodiments by the voice interaction system 106 in the operating environment 100 of FIG. 1.

At 702, the voice interaction system 106 can receive audio data. The audio data can include speech 114 from the user 102. The audio data can be received by a microphone (e.g., the microphone 108) and can be stored (e.g., in the storage device 118). The audio data can be converted into a digital format to facilitate storage and transmission. The speech 114 of the user 102 can relate to an issue of the user 102. The issue can be any customer service issue related to a service or product. The speech 114 can include a query or request for assistance.

At 704, the voice interaction system 106 can determine a prior classification of the user 102. For example, the voice interaction system 106 can determine if the user 102 has previously interacted with the voice interaction system 106 and if a prior user group model was assigned to the user 102. Identification of prior interaction with the user 102 can be determined in a number of ways including, for example, based on account information of the user 102 or voice indication of the user 102.

At 706, the voice interaction system 106 can determine if the prior assigned user group model should continue to be assigned to the user 102 or if a different user group model should be assigned to the user 102. The determination can be made based on the newly received audio data from the user

102 including, for example, features extracted from the new audio data. In this way, interaction with the user 102 can evolve over time as desired to improve the experience of the user 102 as the user 102, for example, increases her domain knowledge of issues being handled by the voice interaction system 106. Accordingly, re-assignment or re-classification of the user 102 in relation to a different group user model can be made over time.

In various embodiments, two or more users can be grouped or cluster together under a specific user interaction model. In various embodiments, each user can be assigned to a customized user interaction model that is unique to a particular user. In doing so, the customized user interaction model can be generated and/or modified during each interaction with the user 102.

In various embodiments, the voice interaction system 106 can generate audio data to provide to the user 102 that varies in sound (e.g., voice style or characteristics) based on the group user model assigned to the user 102. In various embodiments, the generated audio data provided to the user 102 can be unique for the specific user 102 (and can vary or be unique for other users or groups of users). In various embodiments, the responsive audio data generated by the voice interaction system 106 can vary by tone, accent, dialect, speed, pitch, and/or cadence in order to match or approximately match such characteristics of the user 102 and/or characteristics of clustered users mapped to the same group user model.

For many conventional voice interaction systems, the same robotic voice outputs all generated audio provided to the user. Many users find such robotic voices to be cold and impersonal, and therefore customers do not feel connected to the robotic voice. Further, many customers may have difficulty understanding specific dialects or pronunciations used by the non-adaptable robotic voice.

Accordingly, as described herein, the voice interaction system 106 can produce similar dialects and pronunciations that the user 102 exhibits to make the user feel more comfortable. In turn, the user 102 can better understand the generated audio data provided by the voice interaction system 106 which can lead to improved trust and reliability of the voice interaction system 106 by the user 102.

In various embodiments, a group user model can include or specify a type of robotic voice that vary by tone, accent, dialect, speed, pitch, and/or cadence in comparison to the robotic voice used for another group user model. The robotic voice for a particular group user model can match or approximately match voice characterizes of the users assigned to the group user model such that the robotic voice generated for interaction with the users of the group can sound similar to the users. In this manner, a robotic voice can be provided to the user 102 that has a voice similar to the user 102—for example, that has a dialect and pronounces words in a manner similar to users of the same group user model.

In various embodiments, a template robotic voice can be generated. The template robotic voice can then be manipulated to adjust characteristics of the robotic voice for each group user model (or for a particular user). In various embodiments, words and/or phrases from the template robotic voice can be adjusted (e.g., through dynamic time warping) to adjust the dialect or pronunciation used by the robotic voice to more closely match voice characterizations of the users of a particular group user model. This can enable a template robotic voice to be mapped between any cluster or grouping of the users such that users with similar voice characteristics are provided a robotic voice that sounds more familiar to the users and is more relatable and easier to understand.

In various embodiments, the adjustments to the template robotic voice can be applied to a human voice—for example, the voice of a customer service representative or other human interacting with the user 102. In various embodiments, the voice of the human customer service representative can be modified to match the voice characteristics of the user 102, to enhance understanding by the user 102. Techniques for altering a template robotic voice or a human voice to more closely match voice characteristics of the user 102 can be applied to any customer interaction system including, for example, automatic teller machines (ATMs) or any automated voice system.

Figure 8:
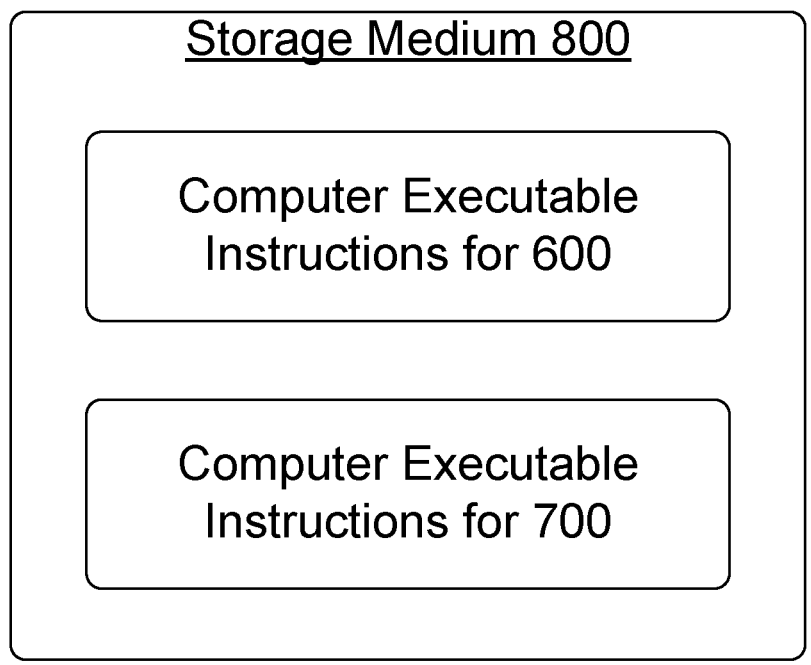
FIG. 8 illustrates a storage medium.

FIG. 8 illustrates a storage medium 800. Storage medium 800 may represent an implementation of the storage device 118. The storage medium 800 can comprise any non-transitory computer-readable storage medium or machine-readable storage medium. In various embodiments, the storage medium 800 can comprise a physical article of manufacture. In various embodiments, storage medium 800 can store computer-executable instructions, such as computer-executable instructions to implement one or more of logic flows or operations described herein, such as the logic flow 600 of FIG. 6 and/or the logic flow 700 of FIG. 7. In various embodiments, storage medium 800 can store computer-executable instructions, such as computer-executable instructions to implement any of the features or functions of any of the components described in FIG. 1. Examples of a computer-readable storage medium or machine-readable storage medium can include any tangible media capable of storing electronic data. Examples of computer-executable instructions can include any type of computer readable code.

Figure 9:
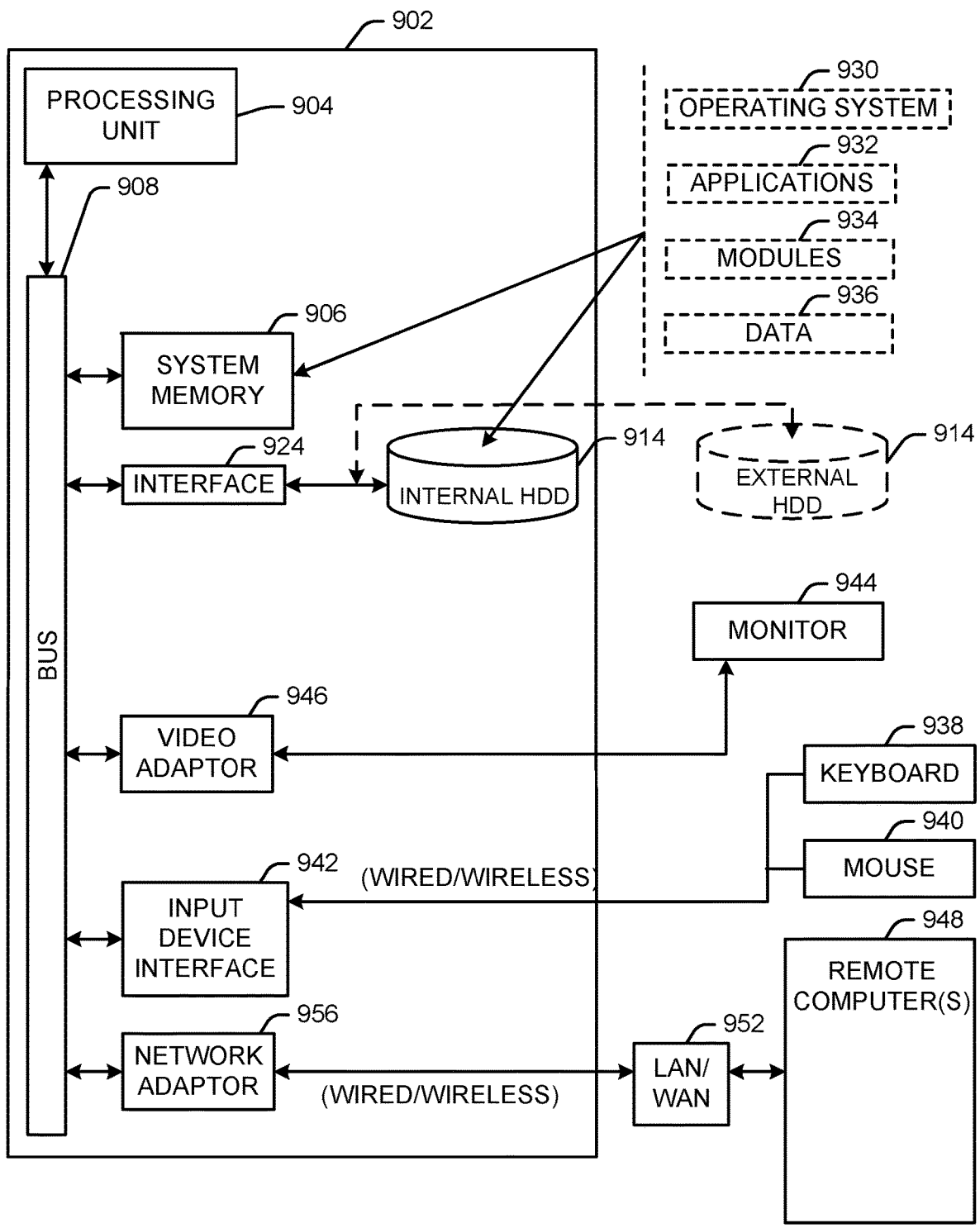
FIG. 9 illustrates a computing architecture.

FIG. 9 illustrates a computing architecture 900 that can implement various embodiments described herein. In various embodiments, the computing architecture 900 can comprise or be implemented as part of an electronic device. In various embodiments, the computing architecture 900 can represent an implementation of the local device 104 and/or the voice interaction system 106. In various embodiments, the computing architecture 900 can represent an implementation of the voice interaction system 106 for dynamically customizing a user's interaction with menu systems provided by the voice interaction system 106.

The computing architecture 900 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 9, the computing architecture 900 can comprise a computer 902 having a processing unit 904, a system memory 906 and a system bus 908. The processing unit 904 can be any of various commercially available processors or can be a specially designed processor.

The system bus 908 provides an interface for system components including, but not limited to, an interface between the system memory 906 and the processing unit 904. The system bus 908 can be any of several types of bus structure that may further interconnect to a memory bus (with or without a memory controller), a peripheral bus, and a local bus using any of a variety of commercially available bus architectures.

The system memory 906 can include any type of computer-readable storage media including any type of volatile and non-volatile memory. The computer 902 can include any type of computer-readable storage media including an internal (or external) hard disk drive (HDD) 914. In various embodiments, the computer 902 can include any other type of disk drive such as, for example, a magnetic floppy disk and/or an optical disk drive. The HDD 914 can be connected to the system bus 908 by a HDD interface 924.

In various embodiments, any number of program modules can be stored in the drives and memory units 906 and/or 914 such as, for example, an operating system 930, one or more application programs 932, other program modules 934, and program data 936.

A user can enter commands and information into the computer 902 through one or more wired/wireless input devices such as, for example, a keyboard 938 and a pointing device, such as a mouse 940. These and other input devices can be connected to the processing unit 904 through an input device interface 942 that is coupled to the system bus 908. A monitor 944 or other type of display device can also be connected to the system bus 908 via an interface, such as a video adaptor 946. The monitor 944 may be internal or external to the computer 902.

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a smartphone, a tablet, a peer device or other common network node, and typically includes many or all of the elements described relative to the computer 902. The logical connections depicted include wired and/or wireless connectivity to networks 952 such as, for example, a local area network (LAN) and/or larger networks, for example, a wide area network (WAN). Networks 952 can provide connectivity to a global communications network such as, for example, the Internet. A network adapter 956 can facilitate wired and/or wireless communications to the networks 952. The computer 902 is operable to communicate over any known wired or wireless communication technology, standard, or protocol according to any known computer networking technology, standard, or protocol.

Figure 10:
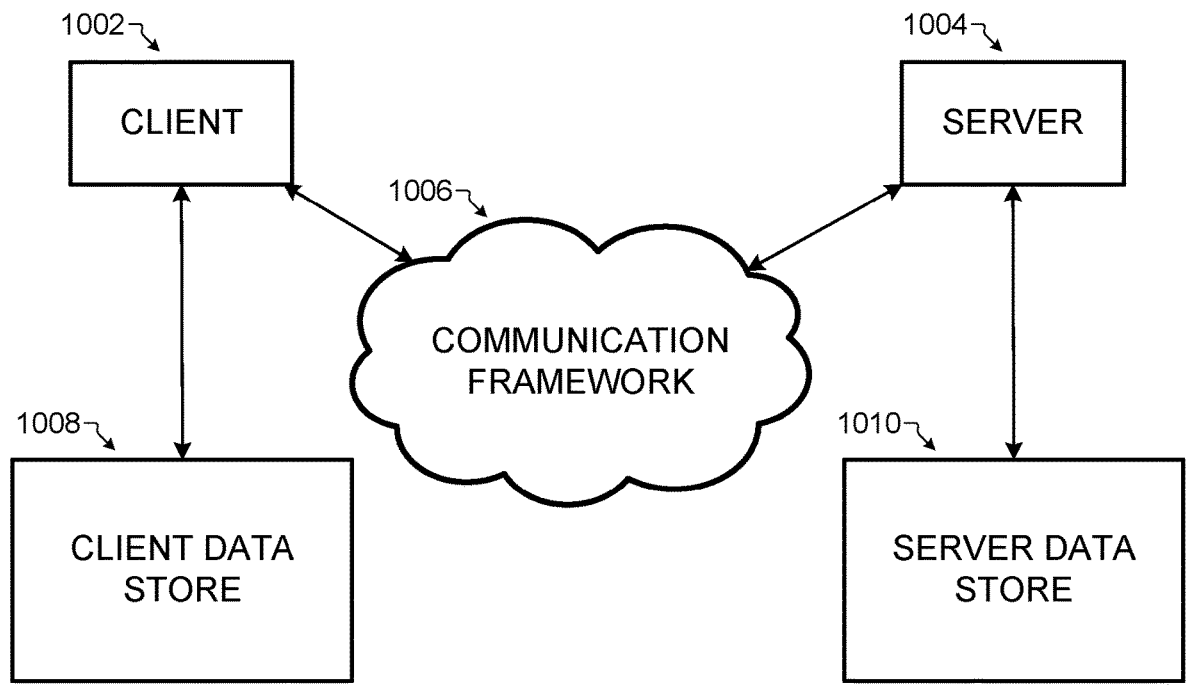
FIG. 10 illustrates a communication architecture.

FIG. 10 illustrates a block diagram of a communication architecture 1000. The communication architecture 1000 can implement various embodiments described herein. As shown in FIG. 10, the communication architecture 1000 comprises one or more clients 1002 and servers 1004. The client 1002 can represent an implementation of the local device 104 and/or use of the local device 104 to interact with the voice interaction system 106. One of the servers 1004 can represent an implementation of the voice interaction system 106 and/or operation of the voice interaction system 106 to dynamically customize menu systems provided to a user by the voice interaction system 106 as described herein.

The client 1002 and the server 1004 can be operatively connected to a client data store 1008 and a server data store 1010, respectively, that can be employed to store information local to the respective client 1002 and server 1004. In various embodiments, the server 1004 can implement one or more of logic flows or operations described herein and/or any of the functions and features described in relation to voice interaction system 106.

The client 1002 and the server 1004 can communicate data or other information between each other using a communication framework 1006. The communications framework 1006 can implement any known communications technique or protocol. The communications framework 1006 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1006 can operate over any communication media according to any networking technology including any wired or wireless communications standard or protocol, or any combination thereof.

The following set of examples pertain to further embodiments.

Example 1 is an apparatus comprising a storage device and logic, at least a portion of the logic implemented in circuitry coupled to the storage device, the logic to receive audio data including speech of a user, the speech of the user relating to a user issue, extract one or more features from the received audio data, the one or more features including a vocabulary of the speech of the user, compare the one or more extracted features from the received audio data to features associated with a plurality of user group models, determine a user group model to assign to the user from the plurality of user group models based on the comparison of the one or more extracted features from the received audio data and the features associated with the plurality of user group models, generate audio data in response to the received audio data based on the determined user group model assigned to the user, and provide the generated responsive audio data to the user.

Example 2 is an extension of Example 1 or any other example disclosed herein, the one or more extracted features including at least one of a speed of the speech of the user and phrases of the speech of the user.

Example 3 is an extension of Example 1 or any other example disclosed herein, the one or more extracted features including at least one of a dialect, an accent, and a pronunciation of the speech of the user.

Example 4 is an extension of Example 1 or any other example disclosed herein, the determined user group model associated with at least one of a perceived education level of the user, a perceived domain knowledge of the user, and a perceived language literacy of the user.

Example 5 is an extension of Example 1 or any other example disclosed herein, the determined user group model to specify one or more menu options provided to the user in the generated responsive audio data.

Example 6 is an extension of Example 5 or any other example disclosed herein, the determined user group model to specify an order the one or more menu options are provided to the user in the generated responsive audio data.

Example 7 is an extension of Example 5 or any other example disclosed herein, the determined user group model to specify at least one of a dialect, an accent, and a tone of the one or more menu options provided to the user in the generated responsive audio data.

Example 8 is an extension of Example 5 or any other example disclosed herein, the determined user group model to specify a vocabulary used to describe the one or more menu options provided to the user in the generated responsive audio data.

Example 9 is an extension of Example 1 or any other example disclosed herein, the logic to generate visual data in response to the received audio data based on the determined interaction model and to provide the generated responsive visual data to the user.

Example 10 is a method comprising receiving audio data including speech of a user, the speech of the user relating to a user issue, extracting one or more features from the received audio data, the one or more features including a vocabulary of the speech of the user, comparing the one or more extracted features from the received audio data to features associated with a plurality of group user models, determining a group user model from the plurality of group user models to assign to the user based on the comparison of the one or more extracted features to the features associated with the plurality of group user models, each group user model in the plurality of group user models assigned to a plurality of users, generating audio data in response to the received audio data based on the determined group user model assigned to the user, and providing the generated responsive audio data to the user, the generated responsive audio data including a set of menu options provided to the user corresponding to the determined group user model, a vocabulary used to describe the menu options determined by the determined group user model.

Example 11 is an extension of Example 10 or any other example disclosed herein, the determined group user model to specify at least one of a dialect, a tone, and an accent of the generated responsive audio data.

Example 12 is an extension of Example 10 or any other example disclosed herein, further comprising extracting a pronunciation of the speech of the user.

Example 13 is an extension of Example 10 or any other example disclosed herein, the determined group user model associated with a language literacy of the user, a level of expertise of the user, and an education level of the user.

Example 14 is an extension of Example 10 or any other example disclosed herein, the determined group user model to specify an order of the set of menu options.

Example 15 is an extension of Example 10 or any other example disclosed herein, wherein the set of menu options and the vocabulary used to describe the menu options vary for each group user model.

Example 16 is at least one non-transitory computer-readable medium comprising a set of instructions that, in response to being executed on a computing device, cause the computing device to receive audio data including speech of a user, the speech of the user relating to a user issue, extract one or more features from the received audio data, the one or more features including a vocabulary of the speech of the user, compare the one or more extracted features from the received audio data to features associated with a plurality of interaction models, determine an interaction model to assign to the user from the plurality of interaction models based on the comparison of the one or more extracted features from the received audio data and the features associated with the plurality of interaction models, generate audio data in response to the received audio data based on the determined interaction model, generate graphical data in response to the received audio data based on the determined interaction model, and provide the generated responsive audio data and the generated responsive graphical data to the user.

Example 17 is an extension of Example 16 or any other example disclosed herein, the determined interaction model associated with a perceived level of education of the user.

Example 18 is an extension of Example 16 or any other example disclosed herein, the one or more extracted features including a pronunciation of the vocabulary of the speech of the user.

Example 19 is an extension of Example 16 or any other example disclosed herein, the interaction model comprising a customized model unique to the user.

Example 20 is an extension of Example 16 or any other example disclosed herein, the interaction model comprising a group model assigned to a cluster of users.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. An apparatus, comprising:
   a storage device; and
   logic, at least a portion of the logic implemented in circuitry coupled to the storage device, the logic to:
   receive audio data including speech of a user, the speech relating to a query or request for assistance;
   extract one or more features from the audio data, the one or more features including discernable characteristic of the speech of the user;
   compare the one or more extracted features from the audio data to features associated with a plurality of user group models;
   determine a user group model to assign to the user from the plurality of user group models based on the comparison of the one or more extracted features from the received audio data and the features associated with the plurality of user group models;
   specify one or more menu options provided to the user related to the discernable characteristic of the speech and responsive to assignment of the user to the user group model;
   generate a response to the query or request with at least one of the one or more menu options;
   generate audio data for the response based on the determined user group model for the user; and
   provide the generated responsive audio data to the user.

2. The apparatus of claim 1, the logic to determine a prior user group model assigned to the user based on account information or voice indication.

3. The apparatus of claim 1, the one or more extracted features including at least one of a speed of the speech of the user and phrases of the speech of the user.

4. The apparatus of claim 1, the one or more extracted features including at least one of a dialect, an accent, and a pronunciation of the speech of the user.

5. The apparatus of claim 1, the determined user group model for the user associated with at least one of a perceived education level of the user, a perceived domain knowledge of the user, and a perceived language literacy of the user.

6. The apparatus of claim 5, the determined user group model to specify an order the one or more menu options are provided to the user in the generated responsive audio data.

7. The apparatus of claim 5, the determined user group model to specify at least one of a dialect, an accent, and a tone of the one or more menu options provided to the user in the generated responsive audio data.

8. The apparatus of claim 5, the determined user group model to specify a vocabulary used to describe the one or more menu options provided to the user in the generated responsive audio data.

9. The apparatus of claim 1, the determined user group model to specify one or more menu options provided to the user in the generated responsive audio data.

10. The apparatus of claim 1, the logic to generate visual data in response to the received audio data based on the determined user group model and to provide the generated responsive visual data to the user.

11. A computer-implemented method, comprising:
receiving audio data including speech of a user, the speech relating to a query or request for assistance;
extracting one or more features from the audio data, the one or more features including discernable characteristic or vocabulary of the speech of the user;
comparing the one or more extracted features from the audio data to features associated with a plurality of user group models;
determining a user group model to assign to the user from the plurality of user group models based on the comparison of the one or more extracted features from the received audio data and the features associated with the plurality of user group models;
specifying one or more menu options provided to the user related to the discernable characteristic of the speech and responsive to assignment of the user to the user group model;
generating a response to the query or request with at least one of the one or more menu options;
generating audio data for the response based on the determined user group model for the user; and
providing the generated responsive audio data to the user.

12. The computer-implemented method of claim 11, comprising determining a prior user group model assigned to the user based on account information or voice indication.

13. The computer-implemented method of claim 11, the one or more extracted features including at least one of a speed of the speech of the user and phrases of the speech of the user.

14. The computer-implemented method of claim 11, the one or more extracted features including at least one of a dialect, an accent, and a pronunciation of the speech of the user.

15. The computer-implemented method of claim 11, the determined user group model for the user associated with at least one of a perceived education level of the user, a perceived domain knowledge of the user, and a perceived language literacy of the user.

16. The computer-implemented method of claim 15, the determined user group model to specify an order the one or more menu options are provided to the user in the generated responsive audio data.

17. The computer-implemented method of claim 15, the determined user group model to specify at least one of a dialect, an accent, and a tone of the one or more menu options provided to the user in the generated responsive audio data.

18. The computer-implemented method of claim 15, the determined user group model to specify a vocabulary used to describe the one or more menu options provided to the user in the generated responsive audio data.

19. The computer-implemented method of claim 11, the determined user group model to specify one or more menu options provided to the user in the generated responsive audio data.

20. The computer-implemented method of claim 11, comprising generating visual data in response to the received audio data based on the determined user group model and to provide the generated responsive visual data to the user.

* * * * *